Figure 1:
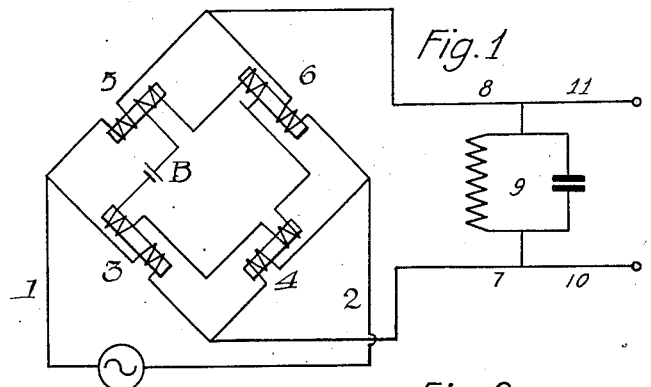

July 31, 1928.

O. VON BRONK 1,678,965

FREQUENCY MULTIPLIER

Filed Sept. 3, 1921

Inventor
OTTO von BRONK
By his Attorney
Ira J. Adams

Patented July 31, 1928.

1,678,965

UNITED STATES PATENT OFFICE.

OTTO VON BRONK, OF BERLIN, GERMANY, ASSIGNOR TO GESELLSCHAFT FÜR DRAHT-LOSE TELEGRAPHIE M. B. H., OF BERLIN, GERMANY, A CORPORATION OF GERMANY.

FREQUENCY MULTIPLIER.

Application filed September 3, 1921, Serial No. 498,422, and in Germany August 26, 1913.

Various circuit arrangements are known for increasing the frequency of alternating currents by means of two or four rectifiers. It is also known that iron core impedance coils behave in some respects like rectifiers.

The object of the present invention is to provide circuit arrangements which may be used for increasing the frequency of alternating currents and which are simpler and more economical than the circuits heretofore used.

Figure 2:
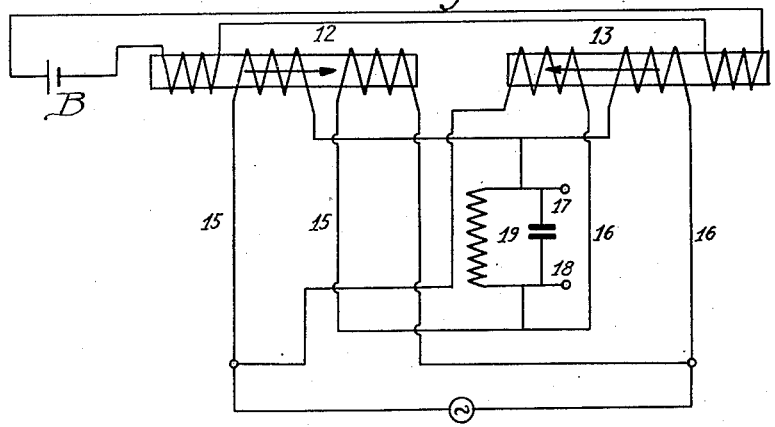
Figure 3:
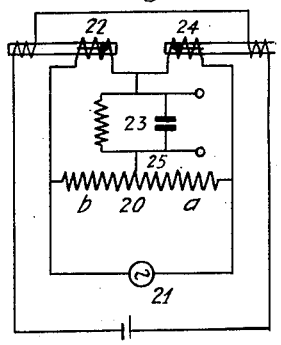

In the drawing:

Fig. 1 is a diagrammatic representation of a circuit arrangement embodying the invention; and Figs. 2 and 3 show circuit arrangements of modified forms.

In the form of the invention shown in Fig. 1, the current from the alternating current generator flows through conductors 1 and 2 to diagonally opposite points of a circuit having the form of a Wheatstone bridge and having one of the four iron core impedance coils 3, 4, 5 and 6 contained in each of the branches of the bridge circuit. The coils 3, 4, 5 and 6 are magnetized by direct current supplied by battery B in a manner well known in the art to a high degree of saturation, and such auxiliary magnetization causes the coils to exhibit marked asymmetric properties with regard to alternating currents flowing thru the alternating current windings. When the alternating current flows in a direction which generates a magnetomotive force aiding the direct current magnetomotive force, the change in flux for that half the wave is small since the magnetic core is already saturated, and hence that half the wave is allowed to pass practically unimpeded by the coil.

Conversely when current flows in a direction which generates a magnetomotive force bucking the direct current magnetomotive force, the change in flux for the half the wave is large, and hence that half the wave is greatly impeded, and the wave form greatly distorted thereby inducing higher frequencies.

It will be easily understood that the coils 3, 4, 5 and 6 will be arranged with respect to their asymmetries so that a harmonic alternating current may be obtained from the output conductors 10 and 11 of double or more the generator frequency.

In order to accomplish this result, it will be noted, the asymmetries of coils 3, 4, 5 and 6 will all be in the same sense considering the paths of the bridge connecting the conductors 7 and 8.

The currents of higher frequencies are conducted from the other diagonally opposite points of the bridge circuit by conductors 7 and 8 across which is connected an oscillating circuit 9 tuned to the higher frequency or harmonic which it is desired to utilize. The tuning of the oscillating circuit 9 to the desired harmonic frequency causes said circuit to oppose by an infinite impedance currents of such frequency and thereby causes such curents to pass through conductors 10 and 11 to the point of utilization, such, for example, as an antenna or a second system for further increasing the frequency; whereas, currents of frequency other than the frequency which it is desired to utilize may flow through the oscillating circuit 9 so that such currents do not reach the antenna or other point to which the conductors 10 and 11 are connected.

The above described arrangement may be simplified in such a manner that instead of four iron core impedance coils only two such coils are used, whereby space as well as apparatus will be saved and, the iron being reduced, the operating efficiency will be increased.

Fig. 2 illustrates such a circuit. In this arrangement, two iron core impedance coils 12 and 13, are each provided with two separate windings wound in the same direction. The feeding of the coils may be accomplished by an alternating current machine 14, through conductors 15 and 16, in the manner shown in the drawing. The increased frequency may be taken from conductors 17, 18 and the oscillating circuit 19.

Fig. 3 shows a further modification of the circuit in which a pair of the iron core impedances are replaced by a retardation coil 20. The current flows alternately from the machine 21 through a path including the valve 22, the oscillating circuit 23, and branch $a$ of the retardation coil 20, and a path including valve 24, oscillating circuit 23, and branch $b$ of the retardation coil 20. Finally, the retardation coil 20 may consist of the winding of machine 21, in which case the conductor 25 must be connected with the alternating current machine. Furthermore, instead of two halves $a$ and $b$ of the retardation coil 20, two capacities connected in series may be used, in which case the conductor 25, must be connected with the terminals of both condensers.

Having thus described my invention I wish to be limited only to the extent indicated in the following claims:

1. A circuit arrangement for increasing the frequency of alternating currents comprising a circuit arrangement in the form of a Wheatstone bridge, a winding in each branch of said bridge, a magnetic core in each winding, means for substantially saturating said cores with direct current flux, the windings and cores being so related that the direct current flux aids the flux due to the windings in two of the branches and opposes the flux due to the windings in the other two branches, whereby a plurality of harmonics are produced, a source of alternating current connected to opposite points of said bridge, output terminals connected to the other diagonally opposite points of said bridge and means connected across said output terminals for short-circuiting all of the harmonics except the one at the desired frequency.

2. A circuit arrangement for increasing the frequency of alternating currents comprising a circuit arranged in the form of a Wheatstone bridge, a winding in each of the branches of the bridge circuit, a magnetic core about which the windings in two opposite branches of the bridge circuit are wound, a second magnetic core about which the windings in the other two opposite branches of the bridge circuit are wound, means for substantially saturating each core with direct current flux, the windings and cores being so related that when the direct current flux in one core is aiding the flux due to the current in the windings on that core, the direct current flux in the other core is opposing the flux due to the currents in the windings on that core, an alternating current generator connected to diagonally opposite points of said bridge circuit, output terminals connected to the other diagonally opposite points of the bridge circuit, and a trap circuit tuned to the output frequency for trapping all of the plurality of harmonics produced in said bridge circuit, except the one at the output frequency.

3. A circuit arrangement for increasing the frequency of alternating currents comprising a circuit arranged in the form of a Wheatstone bridge, a polarized magnetic core impedance coil in each branch of the bridge circuit, a source of alternating current connected to diagonally opposite points of said bridge circuit, output terminals connected to the other diagonally opposite points of said bridge circuit, and a trap circuit tuned to the output frequency comprising a capacitance and an inductance in parallel connected across said output terminals.

4. A circuit arrangement for increasing the frequency of alternating currents comprising a circuit arrangement in the form of a Wheatstone bridge, a winding in each branch of the bridge circuit, a magnetic core in each winding, means for substantially saturating said magnetic core with direct current flux, the windings and cores being so related that the direct current flux acts to distort the normal alternating current sine wave and produce a plurality of harmonics in said bridge circuit, a source of alternating current connected to diagonally opposite points of the bridge, output terminals connected to the other diagonally opposite points for taking off the plurality of harmonics from said bridge, and a trap circuit tuned to the output frequency and comprising a capacitance and an inductance in parallel connected across said output terminals, whereby all of said plurality of harmonics will be short-circuited, except the one at the desired frequency.

OTTO von BRONK.